US007716832B2

(12) United States Patent
Miller et al.

(10) Patent No.: US 7,716,832 B2
(45) Date of Patent: May 18, 2010

(54) METHOD OF MANUFACTURING A FLUID EJECTION DEVICE

(75) Inventors: Richard Todd Miller, Corvallis, OR (US); Susanne L Kumpf, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 181 days.

(21) Appl. No.: 11/612,811

(22) Filed: Dec. 19, 2006

(65) Prior Publication Data

US 2007/0087484 A1 Apr. 19, 2007

Related U.S. Application Data

(62) Division of application No. 10/425,749, filed on Apr. 29, 2003, now Pat. No. 7,168,157, which is a division of application No. 09/846,124, filed on Apr. 30, 2001, now abandoned.

(51) Int. Cl.
*B23P 17/00* (2006.01)
*B21D 53/76* (2006.01)

(52) U.S. Cl. ....................... 29/890.1; 29/610.1; 29/611; 29/612; 29/620; 347/61; 347/63; 347/71; 438/21

(58) Field of Classification Search ................ 29/890.1, 29/592, 610.1, 611, 612, 620, 829; 257/E49.004; 347/61–63, 71; 438/21
See application file for complete search history.

(56) References Cited

U.S. PATENT DOCUMENTS

| | | | |
|---|---|---|---|
| 4,376,945 A | 3/1983 | Hara et al. | |
| 4,513,298 A | 4/1985 | Scheu | |
| 4,535,343 A | 8/1985 | Wright et al. | |
| 4,602,421 A | 7/1986 | Lee et al. | |
| 4,694,306 A | 9/1987 | Ikeda et al. | |
| 4,716,423 A | 12/1987 | Chan et al. | |
| 4,809,428 A * | 3/1989 | Aden et al. | 29/611 |
| 4,866,460 A | 9/1989 | Shiozaki | |
| 5,159,353 A | 10/1992 | Fasen et al. | |
| 5,159,430 A | 10/1992 | Manning et al. | |
| 5,232,865 A | 8/1993 | Manning et al. | |
| 5,330,930 A | 7/1994 | Chi | |
| 5,459,501 A | 10/1995 | Lee et al. | |
| 5,500,553 A | 3/1996 | Ikegami | |
| 5,744,846 A | 4/1998 | Batra et al. | |
| 5,870,121 A | 2/1999 | Chan | |
| 5,883,650 A | 3/1999 | Figueredo et al. | |
| 5,981,329 A | 11/1999 | Batra et al. | |
| 5,998,276 A | 12/1999 | Batra et al. | |
| 6,008,082 A | 12/1999 | Rolfson et al. | |

FOREIGN PATENT DOCUMENTS

| | | |
|---|---|---|
| EP | 0514706 | 11/1992 |
| EP | 0674995 | 10/1995 |
| JP | 10119341 | 12/1998 |

* cited by examiner

*Primary Examiner*—Thiem Phan

(57) ABSTRACT

A heating element of a printhead has a conductive layer deposited over a substrate, and a resistive layer deposited over and in electrical contact with the conductive layer.

5 Claims, 5 Drawing Sheets

METHOD OF MANUFACTURING A FLUID EJECTION DEVICE

CROSS-REFERENCE TO RELATED APPLICATION

This application is a divisional of copending U.S. utility application entitled, "Heating Element of a Printhead Having Resistive Layer over Conductive Layer," having Ser. No. 10/425,749, filed Apr. 29, 2003, which is a divisional of U.S. utility application entitled "Heating Element of a Printhead Having Resistive Layer over Conductive Layer," having Ser. No. 09/846,124, filed Apr. 30, 2001, now abandoned. The aforementioned applications having Ser. Nos. 10/425,749 and 09/846,124 are both entirely incorporated herein by reference.

FIELD OF THE INVENTION

The present invention relates to printheads, such as those used in inkjet cartridges and the like.

BACKGROUND OF THE INVENTION

Generally, thermal actuated printheads use resistive elements or the like to achieve ink expulsion. A representative thermal inkjet printhead has a plurality of thin film resistors provided on a semiconductor substrate. A top layer defines firing 20 chambers about each of the resistors. Propagation of a current or a "fire signal" through the resistor causes ink in the corresponding firing chamber to be heated and expelled through the corresponding nozzle.

To form the resistors, a resistive material is deposited over an insulated substrate, and a conductive material is deposited over the resistive material. The conductive material is photomasked and wet etched to form conductor traces and a beveled surface adjacent a resistor. However, due to the difficulty in controlling the wet etching process, substantially inconsistent resistor lengths (gap in the conductor line) and beveled angles result. A dry etch is generally not used to etch the conductor traces because dry etch selectivity of typical conductor to resistor materials is poor.

The resistive material is photomasked and etched to form resistors. A passivation layer is deposited over the conductor traces. The passivation layer is often susceptible to pinhole defects, and wet chemistry, including those used in subsequent wet processing and inks, may travel through the defects in the passivation layer to the conductor layer. The conductor layer thereby begins to corrode.

SUMMARY OF THE INVENTION

In the present invention, a heating element of a printhead has a conductive layer deposited over a substrate, and a resistive layer deposited over and in electrical contact with the conductive layer.

Many of the attendant features of this invention will be more readily appreciated as the same becomes better understood by reference to the following detailed description and considered in connection with the accompanying drawings in which like reference symbols designate like parts throughout.

DETAILED DESCRIPTION

Figure 1:
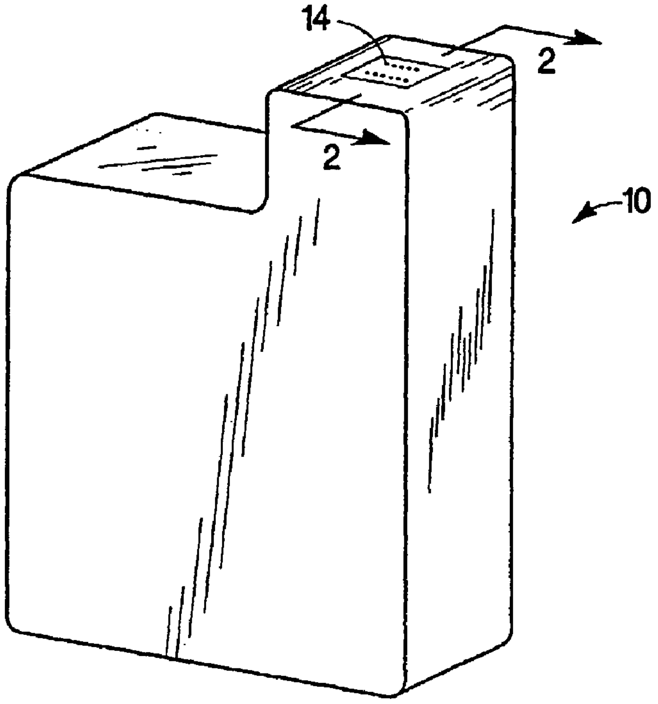
FIG. 1 illustrates a perspective view of a print head cartridge of the present invention.
Figure 2:
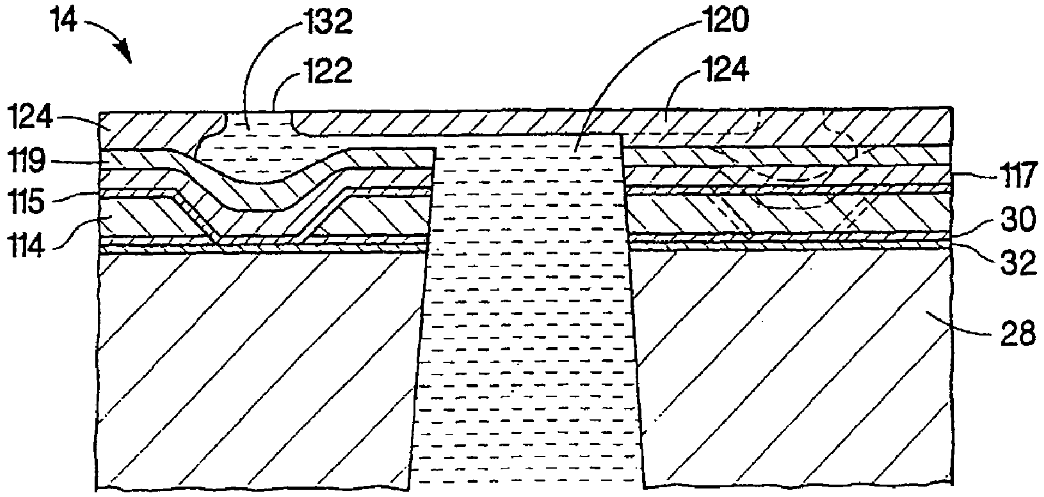
FIG. 2 illustrates a cross-sectional view of an embodiment of the printhead of FIG. 1 shown through section 2-2.

FIG. 1 is a perspective view of an inkjet cartridge 10 with a printhead 14 of the present invention. FIG. 2 illustrates a cross-sectional view through section 2-2 of FIG. 1. In FIG. 2, a thin film stack is applied over a substrate 28. A slot region 120 is shown through the thin film stack and the substrate 28. One method of forming the drill slot is abrasive sand blasting. A blasting apparatus uses a source of pressurized gas (e.g. compressed air) to eject abrasive particles toward the substrate coated with thin film layers to form the slot. The particles contact the coated substrate, causing the formation of an opening therethrough. Abrasive particles range in size from about 10-200 microns in diameter. Abrasive particles include aluminum oxide, glass beads, silicon carbide, sodium bicarbonate, dolomite, and walnut shells.

In one embodiment, the substrate is a monocrystalline silicon wafer. The wafer has approximately 525 microns for a four-inch diameter or approximately 625 microns for a six-inch diameter. In one embodiment, the silicon substrate is p-type, lightly doped to approximately 0.55 ohm/cm.

Alternatively, the starting substrate may be glass, a semiconductive material, a Metal Matrix Composite (MMC), a Ceramic Matrix Composite (CMC), a Polymer Matrix Composite (PMC) or a sandwich Si/xMc, in which the x filler material is etched out of the composite matrix post vacuum processing. The dimensions of the starting substrate may vary as determined by one skilled in the art.

In one embodiment, a capping layer 32 is deposited or grown over the substrate 28. In one embodiment, the layer 32 covers and seals the substrate 28, thereby providing a gas and liquid barrier layer. Because the capping layer is a barrier layer, fluid is substantially restricted from flowing into the substrate 28. Capping layer 32 may be formed of a variety of different materials such as silicon dioxide, aluminum oxide, silicon carbide, silicon nitride, and glass (PSG). In one embodiment, the use of an electrically insulating dielectric material for the capping layer also serves to electrically insulate substrate 28. In one embodiment, the capping layer 32 is a thermal barrier of the substrate from the resistor. The capping layer may be formed using any of a variety of methods known to those of skill in the art such as thermally growing the layer, sputtering, evaporation, and plasma enhanced chemical vapor deposition (PECVD). The thickness of capping layer may be any desired thickness sufficient to cover and seal the substrate. Generally, the capping layer has a thickness of up to about 1 to 2 microns.

In one embodiment, the layer 32 is a phosphorous-doped (n+) silicon dioxide interdielectric, insulating glass layer (PSG) deposited by PECVD techniques. Generally, the PSG layer has a thickness of up to about 1 to 2 microns. In one embodiment, this layer is approximately 0.5 micron thick and forms the remainder of the thermal inkjet heater resistor oxide underlayer. In another embodiment, the thickness range is about 0.7 to 0.9 microns.

In another embodiment, the capping layer 32 is field oxide (FOX) that is thermally grown on the exposed substrate 28. The process grows the FOX into the silicon substrate as well as depositing it on top to form a total depth of approximately 1.3 microns. Because the FOX layer pulls the silicon from the substrate, a strong chemical bond is established between the FOX layer and the substrate.

In one embodiment, a layer 30 is deposited or grown over the capping layer 32. In one embodiment, the layer 30 minimizes junction spiking and electromigration. In one embodiment, the layer 30 is one of titanium nitride, titanium tungsten, titanium, a titanium alloy, a metal nitride, tantalum aluminum, and aluminum silicone.

In one embodiment, layer 32 is deposited over or grown directly onto the substrate 28. In another embodiment, there are layers (not shown), in addition to layer 30 and layer 32, that are deposited over the substrate. These layers are composed of materials chosen from the layers 30 and 32 described above.

In one embodiment, a conductive layer 114 is formed by depositing conductive material over the layer 30. The conductive material is formed of at least one of a variety of different materials including aluminum, aluminum with about ½% copper, copper, gold, and aluminum with ½% silicon, and may be deposited by any method, such as sputtering and evaporation. Generally, the conductive layer has a thickness of up to about 1 to 2 microns. In one embodiment, sputter deposition is used to deposit a layer of aluminum to a thickness of approximately 0.5 micron.

Figure 4A:
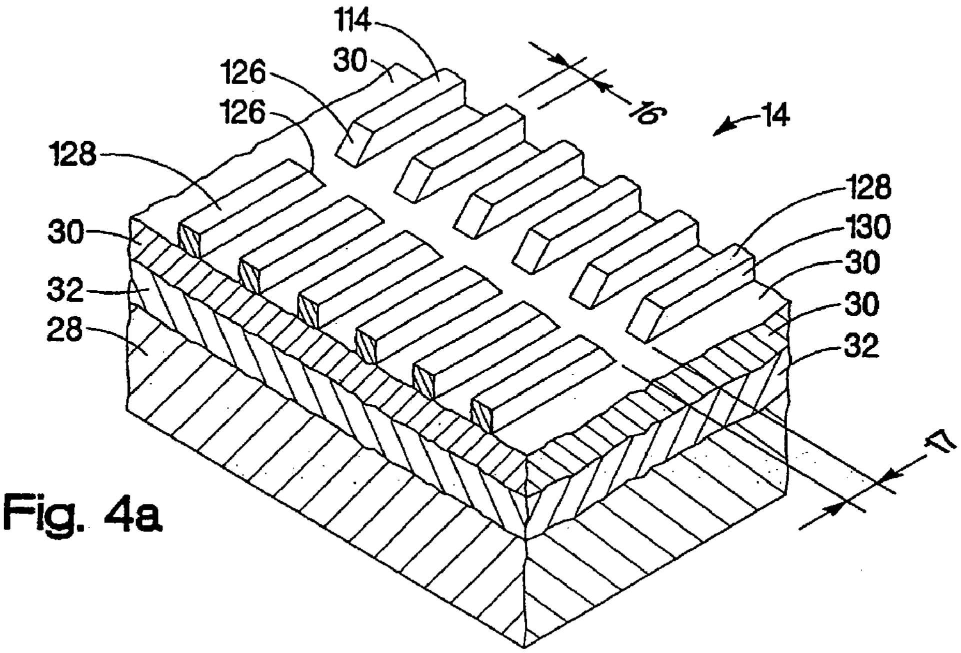
FIG. 4*a* illustrates a perspective view of an embodiment of the printhead formation after the conductor traces have been etched.
Figure 5:
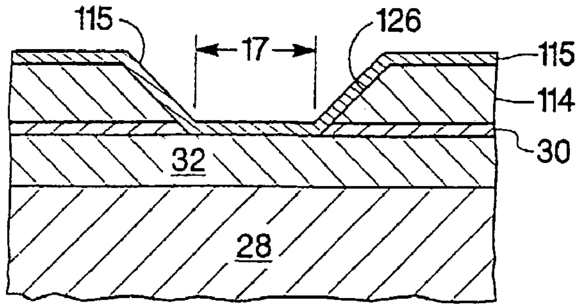
FIG. 5 illustrates a partial cross-sectional view of the formation of FIG. 4*b* through section 5-5.

The conductive layer 114 is patterned and etched as described in more detail below with respect to steps 210 and 220 of FIG. 3. A conductor trace width 16 and a resistor length 17, as shown in FIG. 4*a*, is defined by the etch of the conductive layer. (The resistor length is a gap or opening in the conductive line). At this point, the layer 30, as shown in FIG. 4*a*, or possibly even layer 32, as shown in FIG. 5, is exposed along the resistor length 17 (or opening) in between the traces due to etching. At opposite ends of the defined resistor length 17, the conductive material 114 has a beveled surface 126 defined as described in more detail below. The conductor traces have a top surface 128, two opposing side surfaces 130, and the end beveled surface 126.

Figure 3:
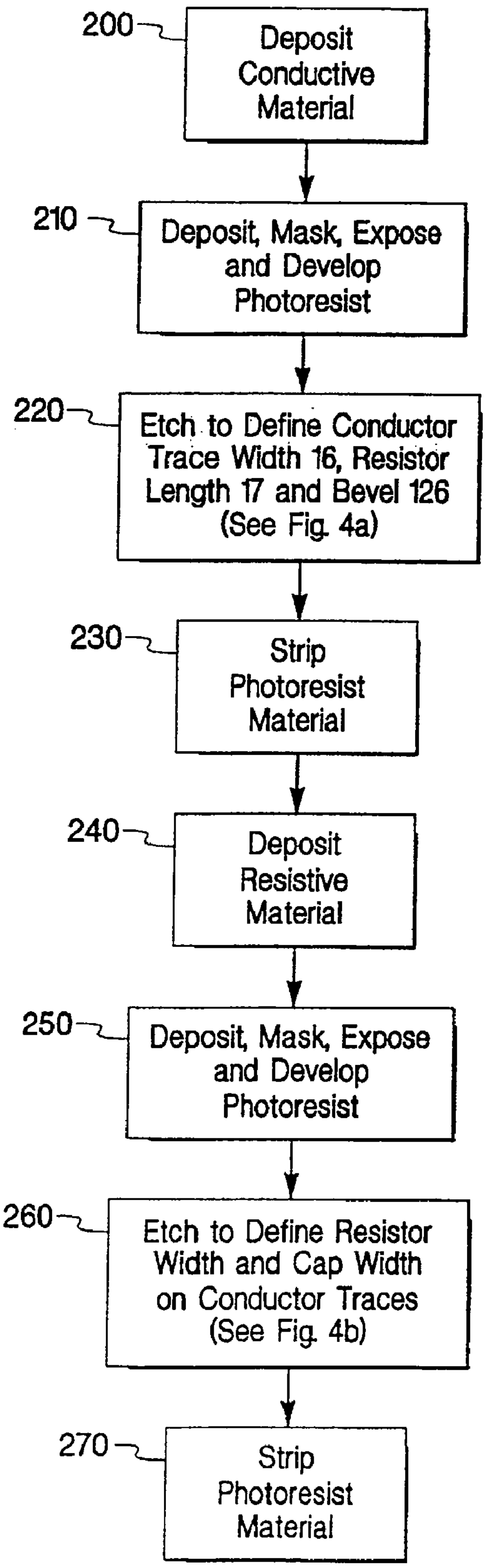
FIG. 3 is a flow chart illustrating an embodiment of the process of forming the resistor over the conductor traces.

After forming the conductor traces, a resistive material 115 is deposited over the etched conductive material 114, as shown in FIG. 2 (step 240 of FIG. 3). The resistive material is etched to form resistors having the resistor length 17, as described in more detail below with respect to steps 250 and 260 of FIG. 3. The width of the resistors across the conductor traces is a cap width 18, which varies with the embodiment, as described in more detail below with regard to FIGS. 6, 7 and 8. There is also a resistor width of the gap 17 that is the same length as the cap width, in one embodiment Alternatively, the resistor width is different than the cap width. In one embodiment, the resistive material encapsulates the conductor traces. In one embodiment, sputter deposition techniques are used to deposit a resistive material layer of tantalum aluminum 115 composite across the etched conductor traces. The composite has a resistivity of approximately 30 ohms/square. Typically, the resistor layer has a thickness in the range of about 500 angstroms to 2000 angstroms. However, resistor layers with thicknesses outside this range are also within the scope of the invention.

A variety of suitable resistive materials are known to those of skill in the art including tantalum aluminum, nickel chromium, and titanium nitride, which may optionally be doped with suitable impurities such as oxygen, nitrogen, and carbon, to adjust the resistivity of the material. The resistive material may be deposited by any suitable method such as sputtering, and evaporation.

As shown in the embodiment of FIG. 2, an insulating passivation layer 117 is formed over the resistors and conductor traces to prevent electrical charging of the fluid or corrosion of the device, in the event that an electrically conductive fluid is used. Passivation layer 117 may be formed of any suitable material such as silicon dioxide, aluminum oxide, silicon carbide, silicon nitride, and glass, and by any suitable method such as sputtering, evaporation, and PECVD. Generally, the passivation layer has a thickness of up to about 1 to 2 microns.

In one embodiment, a PECVD process is used to deposit a composite silicon nitride/silicon carbide layer 117 to serve as component passivation. This passivation layer 117 has a thickness of approximately 0.75 micron. In another embodiment, the thickness is about 0.4 microns. The surface of the structure is masked and etched to create vias for metal interconnects. In one embodiment, the passivation layer places the structure under compressive stress.

In one embodiment, a cavitation barrier layer 119 is added over the passivation layer 117. The cavitation barrier layer 119 helps dissipate the force of the collapsing drive bubble left in the wake of each ejected fluid drop. Generally, the cavitation barrier layer has a thickness of up to about 1 to 2 microns. In one embodiment, the cavitation barrier layer is tantalum. The tantalum layer 119 is approximately 0.6 micron thick and serves as a passivation, anti-cavitation, and adhesion layer. In one embodiment, the cavitation barrier layer absorbs energy away from the substrate during slot formation. In this embodiment, tantalum is a tough, ductile material that is deposited in the beta phase. The grain structure of the material is such that the layer also places the structure under compressive stress. The tantalum layer is sputter deposited quickly thereby holding the molecules in the layer in place. However, if the tantalum layer is annealed, the compressive stress is relieved.

In one embodiment, a top (or barrier) layer 124 is deposited over the cavitation barrier layer 119. In one embodiment, the barrier layer has a thickness of up to about 20 microns. In one embodiment, the barrier layer 124 is comprised of a fast cross-linking polymer such as photoimagable epoxy (such as SU8 developed by IBM), photoimagable polymer or photosensitive silicone dielectrics, such as SINR-3010 manufactured by ShinEtsu™.

In another embodiment, the barrier layer 124 is made of an organic polymer plastic which is substantially inert to the corrosive action of ink. Plastic polymers suitable for this purpose include products sold under the trademarks VACREL and RISTON by E. I. DuPont de Nemours and Co. of Wilmington, Del. The barrier layer 124 has a thickness of about 20 to 30 microns.

In one embodiment, the barrier layer 124 includes a firing chamber 132 from which fluid is ejected, and a nozzle orifice 122 associated with the firing chamber through which the fluid is ejected. The fluid flows through the slot 120 and into the firing chamber 132 via channels formed in the barrier layer 124. Propagation of a current or a "fire signal" through the resistor causes fluid in the corresponding firing chamber to be heated and expelled through the corresponding nozzle 122. In another embodiment, an orifice layer having the orifices 122 is applied over the barrier layer 124.

As shown more clearly in the printhead 14 of FIG. 1, the nozzle orifices 122 are arranged in rows located on both sides of the slot 120. In one embodiment, the nozzle orifices, and corresponding firing chambers are staggered from each other across the slot. In FIG. 2, a fining chamber in the printhead that is staggered across the slot from the firing chamber 132 is shown in dashed lines.

The flow chart of FIG. 3 illustrates an embodiment of the process of forming the heating element of the printhead. After depositing the conductive material in step 200, the conductive material is photomasked, such as by photolithography, and etched to form the conductor traces. In one embodiment, photoresist material is deposited in step 210 over the conductive material. The photoresist material is exposed to light through a mask and developed to form a pattern over the conductive material, as described in more detail below with regard to FIGS. 9*a*, 9*b*, 10 and 11. Conductive material that is not covered by the photoresist material is removed using a dry plasma etch in step 220, which is a conventional gaseous etch technique.

FIG. 4*a* illustrates one embodiment where the formation after the conductor trace width 16 and the resistor length or gap 17 have been etched. The beveled surface 126 of the conductor trace is defined as described in the embodiments below. In another embodiment, only the resistor length or gap 17 is formed in step 220. The trace width and cap width are then formed together in step 260 to look like the embodiment shown in FIG. 8.

Figure 4B:
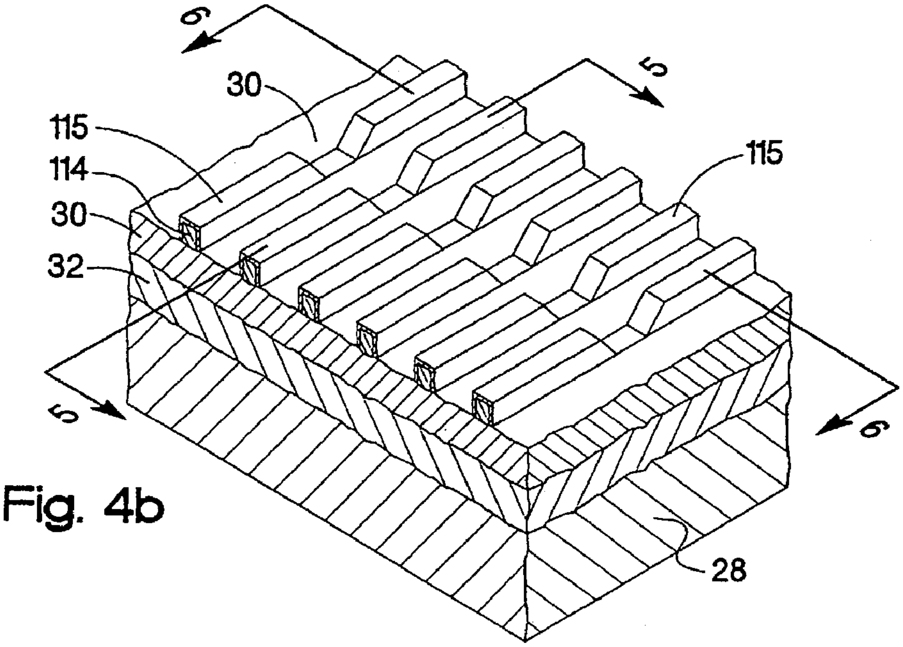
FIG. 4*b* illustrates a perspective view of an embodiment of the printhead formation after the resistors have been etched.

The photoresist material is then stripped in step 230 before the resistive material is deposited in step 240. Similar to step 210, the resistive layer 114 is patterned and etched in step 250, as shown in FIG. 4*b*. Thereby, the cap width 18 of the resistive material and the conductor terminations (not shown) are defined. In one embodiment, the photoresist material is deposited, masked, exposed and developed to the pattern over the resistive material in step 250, as described in more detail below. The resistive layer and photoresist material is then etched in step 260. In one embodiment, the resistive layer is dry etched. In another embodiment, the resistive layer is wet etched. The photoresist material deposited over the resistive layer is removed in step 270 before the passivation layer is deposited.

Figure 6:
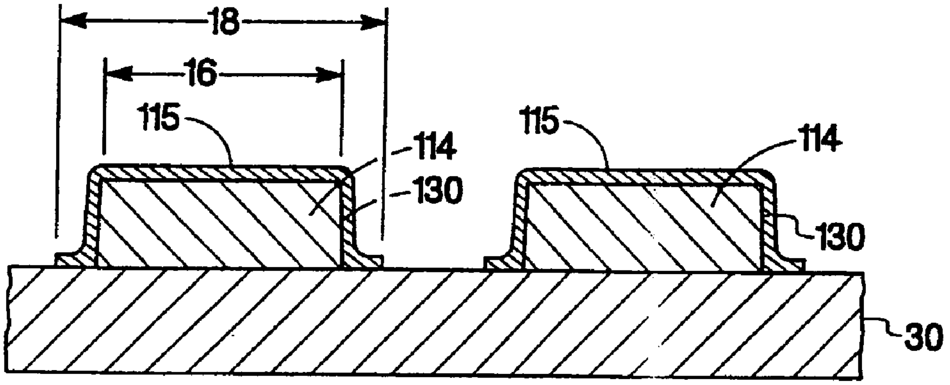
FIG. 6 illustrates a cross-sectional view of the formation of FIG. 4*b* through section 6-6.
Figure 7:
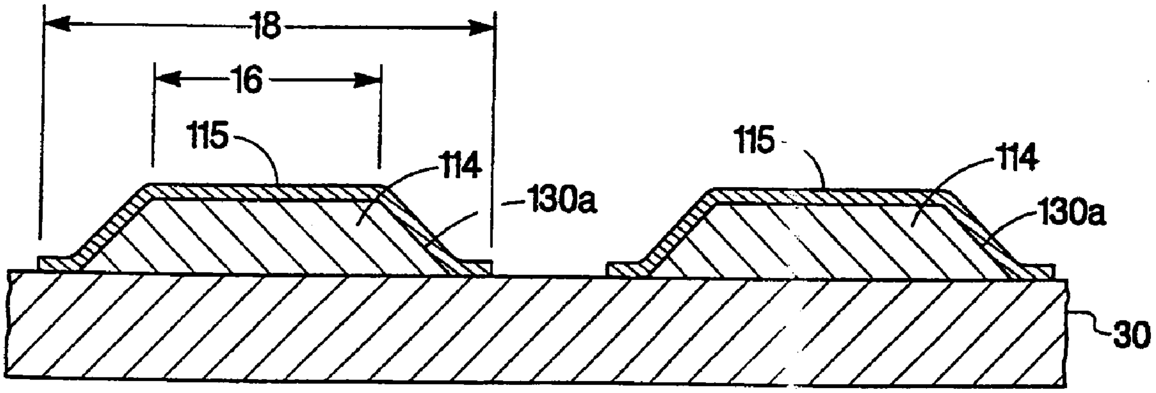
FIG. 7 illustrates another embodiment of the cross-sectional view of the formation of FIG. 4 through section 6-6.
Figure 8:
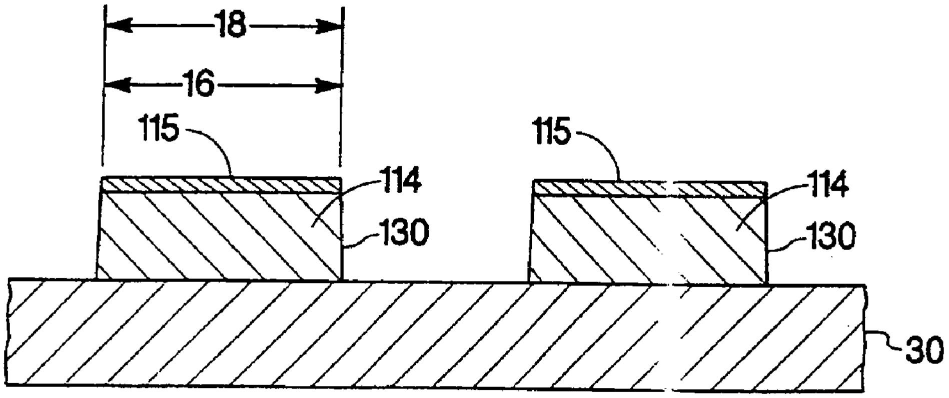
FIG. 8 illustrates another embodiment of the cross-sectional view of the formation of FIG. 4 through section 6-6.

FIG. 5 illustrates a cross-sectional view of the resistive material 115 deposited over the opening (or resistor length 17) and the beveled surfaces 126 of the etched conductive layer 114. FIG. 6 illustrates a cross-sectional view of the width of the conductor traces with the etched resistive material 115 deposited thereover. FIGS. 7 and 8 illustrate other embodiments as alternatives to the embodiment shown in FIG. 6.

For FIG. 5, the photoresist material in step 250 covers the resistor and conductor terminations (not shown). The photoresist material pattern in step 250 varies for defining the formations of FIGS. 6, 7, and 8. For FIGS. 6 and 7, the photoresist material in step 250 is in a pattern that covers the conductor trace. For FIG. 8, the photoresist material in step 250 is in a pattern that defines the top surface 128 of the conductor trace. During the etch step 260, the area that is not covered with the photoresist material is etched away.

In one embodiment, as shown in FIG. 5, the layer 30 is etched away in step 220 with the conductive layer in the area defining the resistor length 17. In one embodiment, the layer 30 is conductive and electrically conducts under the opening in the conductor traces, if not removed. In another embodiment, additionally the layer 32 and/or the substrate 28 are partially etched in the gap area (17). In yet another embodiment, the layer 30 is not etched away with the conductive layer.

In one embodiment, the end beveled surface 126 has an angle of about 35 to 55 degrees with the substrate, as shown in FIG. 5. In another embodiment, the end beveled surface has an angle of about 45 degrees with the substrate. As shown, the beveled surface 126 is substantially smooth from the dry etch. The horizontal length of the beveled surface 126 is about ½ to 3 microns. In one embodiment, the horizontal length depends upon the drop weight of the print cartridges. For higher drop weights, the more slope (or higher length) is desired.

In FIGS. 6 and 8, the side surfaces 130 are substantially vertical, so that conductor traces are able to be etched closer together, thereby increasing the die separation ratio. In one embodiment, the side surfaces 130 of the conductor traces are dry etched in the process described herein. In one embodiment, the side surfaces 130, have an angle of about 60 to 80 degrees with the substrate. In another embodiment, the side surfaces have an angle of about 70 degrees with the substrate. The side surfaces 130 are formed as described herein.

In FIG. 7, the side surfaces 130*a* are sloped more than the side surfaces 130 shown in FIGS. 6 and 8. The side surfaces 130*a* have an angle of about 35 to 55 degrees, or about 45 degrees, with the substrate. In one embodiment, the angle of the side surfaces 130*a* is substantially similar to the angle of the beveled surface 126. In another embodiment, the angle of the side surfaces 130*a* is different than the angle of the beveled surface 126. In one embodiment, the side surfaces 130*a* are formed using the photomasking and dry etching techniques, as described herein. In another embodiment, the side surfaces are formed in a manner substantially similar to forming the end beveled surfaces 126, as described below.

In FIGS. 6 and 7, the cap width 18 of the resistive material is greater than the width 16 of the conductor trace. In this embodiment, the resistive material encapsulates the conductor traces. In the embodiment where the layer 30 is formed of the same material as the resistive material 115, the conductor layer 114 is substantially completed encapsulated. The resistive material encapsulating the side surfaces 130 of the conductor traces aid in protecting the traces from corrosion due to wet chemistry, including those fluids used in subsequent wet processing and inks.

In FIG. 8, the cap width 18 of the resistive material covers the top surface 128 of the conductor traces, the width 16. The side surfaces 130 are not covered with the resistive material in this embodiment. The passivation layer 117, when deposited, is in direct contact with the side surfaces and aid in protecting the conductor traces from corrosion.

Figure 9A:
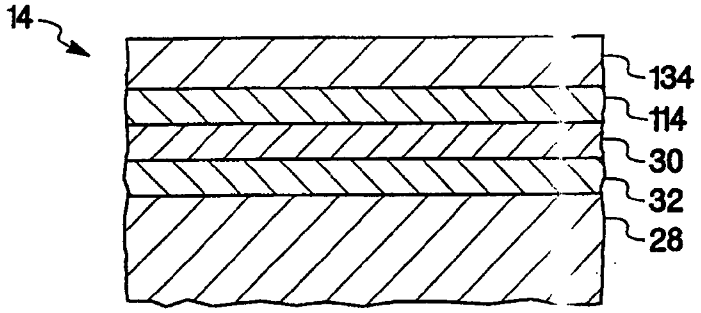
FIG. 9*a* illustrates a layer of photoresist over the conductive layer as part of the process of bevel definition.
Figure 9B:
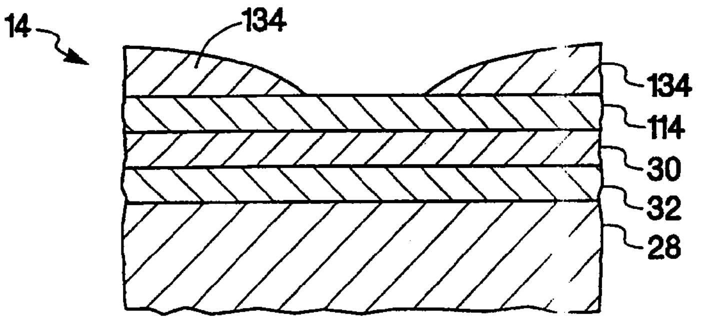
FIG. 9*b* illustrates FIG. 9*a* after exposing the photoresist to light through a half-tone mask.
Figure 10:
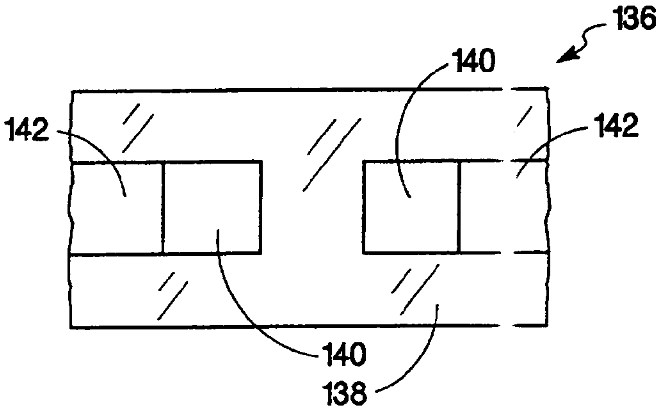
FIG. 10 is a half-tone mask.
Figure 11:
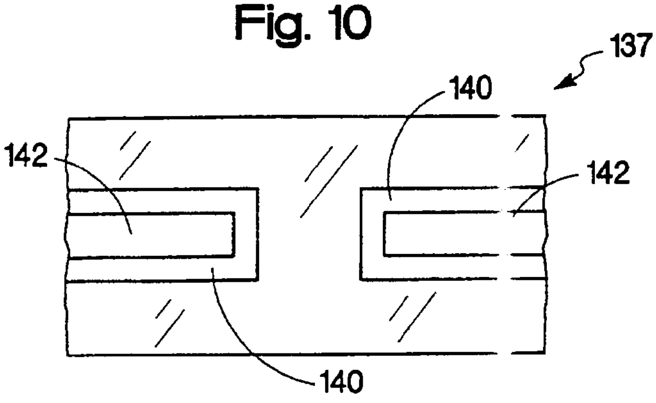
FIG. 11 is another half-tone mask.

In one embodiment of step 210 of FIG. 3, the conductor traces and the beveled surfaces 126 (and in some embodiments, the side surfaces 130*a* of FIG. 7) are defined using masking techniques illustrated in FIGS. 9*a*, 9*b*, and 10. The sloped end surfaces 126 and the substantially vertical side walls 130 are formed using a half-tone mask 136, as shown in FIG. 10. In some embodiments, a half-tone mask 137 (FIG. 11) that is similar to the mask 136 is used to form both the sloped end surfaces 126 and the sloped side surfaces 130*a*. The masks 136 and 137 are described in more detail below.

FIG. 9*a* illustrates a layer of photoresist material 134 over the conductive layer 114 as part of the process of bevel definition. The photoresist material 134 is a chemical substance rendered insoluble by exposure to light. The unexposed areas are washed away. After exposing the photoresist material 134 to light through the mask 136, the formation in cross-section is illustrated in FIG. 9*b*. The photoresist material 134 is sloped as shown in FIG. 9*b* after step 210 is performed. The photoresist material 134 along with the conductor layer 114 of FIG. 9*b* is then etched using a dry etch in step 220. After etching, the beveled surfaces 126 are defined as shown in FIG. 5. In addition, the gap or resistor length 17, and the side surfaces 130, as shown in FIGS. 6 and 8, are defined. In some embodiments the sloped side surfaces 130*a* of FIG. 7 are also defined using this photomask technique, but using the mask 137.

The mask 136 has three areas, area 138, gradiated area 140, and open area 142. The area 138 is substantially non-transparent. In one embodiment, this area 138 is made of chrome. When this area of the mask is placed over the photoresist material 134, and the photoresist material is exposed to light, the area under 138 is unexposed and can be washed away. The open area 142 is an opening in the mask through which the light exposing the photoresist material passes through. The photoresist material under the open area 142 substantially hardens (or is rendered insoluble) in response to the light The area 140 is gradiated. The area 140 gradually moves from being substantially non-transparent to being substantially transparent when moving away from area 138 and closer to area 142. The photoresist material that is exposed to the light under the area 140 forms a slope as shown in FIG. 9*b*.

In an alternative embodiment, the photoresist material is a positive photoresist material. Opposite to the negative photoresist material described above, the positive photoresist material that is not exposed to light is rendered insoluble, while the material that is exposed to light is washed away. A mask used in this embodiment that is similar to mask 136 has, for example, areas 138 and 142 switched to render the same shape of material 134 in FIG. 9*b*. Similarly, the area 140 gradually moves from being substantially non-transparent to being substantially transparent when moving away from area 138 and closer to area 142.

The mask 137 is similar to the mask 136 except that the mask 137 has a u-shaped gradiated area 140 that surrounds the open area 142. The u-shaped gradiated area 140 is in between the open area 142 and the area 138. The u-shaped forms photoresistive material in a substantially trapezoidal cross-section over the conductive material. After the photoresistive material is etched, the sloped end surfaces 126 and the sloped side surfaces 130*a* are formed. In one embodiment, the u-shaped area 140 is formed such that the surfaces 126 and 130*a* have different dimensions and angles. In another embodiment, the u-shaped area 140 is substantially of a uniform width and the surfaces 126 and 130*a* have substantially similar dimensions and angles.

In another embodiment of step 210, the conductor traces and the beveled surfaces 126 (and in some embodiments, the side surfaces 130*a* of FIG. 7) are defined using a technique of intentionally misfocused or indefinite exposure of the photoresist material 134 of FIG. 9*a* to light. The misfocused light functions in a manner similar to the mask 136. In one embodiment, the misfocused light is used in conjunction with a mask having the sections 138 and 142 (not shown). To form the sloped areas of the photoresist material, the light is substantially clearly focused in areas where the photoresist material is rendered insoluble, and gradually changes along the photoresist material surface to being substantially misfocused where the photoresist material is to be removed. The sloped sections of photoresist material as shown in FIG. 9*b* are thereby formed. The beveled surfaces 126 are then defined by etching. Additionally, in another embodiment, the photoresist material is sloped over the width of the conductive material using misfocused light to form the side surfaces 130*a* of FIG. 7.

In another embodiment of step 210, the sloped end surfaces 126 and the sloped side surfaces 130*a* shown in FIG. 7 are formed using a pre-etch hard bake technique. In the pre-etch hard bake technique, the photoresist material 134 of FIG. 9*a* is masked, exposed to light and developed in a pattern to form the conductor traces. Then the photoresist material is exposed to the hard bake (a high temperature) until the photoresist flows into a substantially trapezoidal cross-section. The formation is then etched in step 220 to form the sloped side surfaces 130*a* and the beveled surfaces 126, as shown in FIGS. 5 and 7. In this embodiment, the surfaces 126 and 130*a* have substantially similar dimensions due to the flowing symmetry of the photoresist material.

The cross-sections of the substantially vertical side surfaces 130 illustrated in FIGS. 6 and 8 are capable of being formed by the half-tone mask 136. FIG. 8 is also capable of being formed by either the intentionally misfocused light technique or the pre-etch hard bake technique.

The cross-section of the sloped side surfaces 130*a* illustrated in FIG. 7 is capable of being formed by intentionally misfocused light on the side surfaces, the mask 137, or the pre-etch hard bake. In one embodiment, using any of these three methods for forming the sloped side surfaces 130*a*, the end surfaces 126 are able to be beveled using the same method at the same time.

While the present invention has been disclosed with reference to the foregoing specification and the preferred embodiment shown in the drawings and described above, it will be apparent to those skilled in the art that changes in form and detail may be made therein without departing from the spirit and scope of the invention as defined by the appended claims.

We claim:

1. A method of manufacturing a fluid ejection device comprising:

disposing conductive material over a substrate;

etching the conductive material to define at least one of a conductor trace and a resistor length, wherein the conductor trace has a first section and a second section separate from the first, wherein each of the first and second sections has two opposing side surfaces, and an end surface, wherein the end surface of the first section faces the end surface of the second section, wherein the two opposing side surfaces have an angle with the substrate that is greater than the angle between the substrate and the end surface, the conductor trace having a top surface and an exposed surface area that includes the side surfaces and the top surface;

coupling the two sections of the conductor trace with a heating element, the heating element formed of a material that substantially covers the exposed surface area of the conductor trace; and disposing a top layer over the heating element, wherein the top layer has an orifice through which heated fluid is capable of being ejected.

2. The method of claim 1, wherein the side surfaces are substantially vertical.

3. The method of claim 1 wherein the side surfaces have an angle between about 60 to 80 degrees with the substrate.

4. The method of claim 1 wherein the side surfaces and the end surfaces have an angle between 35 and 60 degrees with the substrate.

5. The method of claim 1 wherein the conductive material is aluminum and is etched with a dry plasma.

* * * * *

UNITED STATES PATENT AND TRADEMARK OFFICE

CERTIFICATE OF CORRECTION

PATENT NO. : 7,716,832 B2
APPLICATION NO. : 11/612811
DATED : May 18, 2010
INVENTOR(S) : Richard Todd Miller et al.

It is certified that error appears in the above-identified patent and that said Letters Patent is hereby corrected as shown below:

In column 8, line 55, in Claim 3, delete "claim 1" and insert -- claim 1, --, therefor.

In column 8, line 57, in Claim 4, delete "claim 1" and insert -- claim 1, --, therefor.

In column 8, line 57, in Claim 4, after "and" delete "the".

In column 8, line 58, in Claim 4, delete "between" and insert -- between about --, therefor.

In column 8, line 60, in Claim 5, delete "claim 1" and insert -- claim 1, --, therefor.

In column 8, line 61, in Claim 5, delete "plasma." and insert -- plasma etchant. --, therefor.

Signed and Sealed this

Tenth Day of August, 2010

David J. Kappos

*Director of the United States Patent and Trademark Office*